United States Patent [19]

Eggert et al.

[11] Patent Number: 4,709,291
[45] Date of Patent: Nov. 24, 1987

[54] PROTECTIVE DEVICE FOR PREVENTING BLOWOUT OF BUSHING IN HIGH-VOLTAGE SWITCHING INSTALLATION

[75] Inventors: Horst Eggert; Willi Olsen, both of Berlin, Fed. Rep. of Germany

[73] Assignee: Siemens Aktiengesellschaft, Munich, Fed. Rep. of Germany

[21] Appl. No.: 772,953

[22] Filed: Sep. 5, 1985

[30] Foreign Application Priority Data

Sep. 7, 1984 [DE] Fed. Rep. of Germany ....... 3433362

[51] Int. Cl.⁴ .............................................. H02H 7/00
[52] U.S. Cl. .......................................... 361/2; 361/1; 361/37; 307/141
[58] Field of Search ...................... 361/1, 2, 37, 87, 89, 361/92, 113; 307/141

[56] References Cited

U.S. PATENT DOCUMENTS 2,838,728  6/1958  Belamin ................................. 361/92
3,887,915  6/1975  Olssen .................................... 361/78

FOREIGN PATENT DOCUMENTS 2216238  10/1973  Fed. Rep. of Germany .
2315323   9/1974  Fed. Rep. of Germany .

Primary Examiner—Roy N. Envall, Jr.
Assistant Examiner—Jeffrey A. Gaffin
Attorney, Agent, or Firm—Kenyon & Kenyon

[57] ABSTRACT

For protecting service personnel during maintenance work on a metal-encapsulated, compressed-gas-insulated high-voltage switching installation, a protective device is provided which is used if gas spaces with voltage-carrying conductor parts are bounded by unilaterally exposed bulkhead bushing insulators. Sensors of the protective device are arranged at the gas spaces and their signals are fed via an evaluating unit to a tripping unit for opening feed switches to cut off the voltage to the conductor elements in the gas spaces as well as for blocking the reclosing of these feed switches.

7 Claims, 5 Drawing Figures

4,709,291

PROTECTIVE DEVICE FOR PREVENTING BLOWOUT OF BUSHING IN HIGH-VOLTAGE SWITCHING INSTALLATION

BACKGROUND OF THE INVENTION

This invention relates to a high-voltage switching installation insulated by compressed gas and having a metal encapsulation, several sections of the encapsulation being partitioned-off gastight by means of bulkhead bushing insulators.

As described in U.S. Pat. No. 3,887,915, a monitoring device responding to interference arcs can be associated with such an installation, the monitoring device containing sensors which can be mounted on the outside of the encapsulation and producing a signal which is fed to an evaluation device. The monitoring device can be connected permanently or only temporarily to the installation for checking the operating state of the system. The known monitoring device includes acoustic sensors, namely, electroacoustic transducers in the form of sound microphones, which are arranged on the outside of the encapsulation for detecting sound waves transmitted through the solid material of the encapsulation. These electroacoustic transducers are always arranged adjacent to a bulkhead bushing insulator which defines a gas space in the encapsulation. This positioning of the transducers enables a determination of the gas space in which the interference arc occurs. In the known monitoring device, the signals of the sensors are fed to an evaluating device which contains amplifiers, frequency and amplitude-dependent filters and a timing device as well as a signaling or indicating device. This special design of the evaluating device picks up, due to the limitation to a given frequency or amplitude range, only the characteristic noises of an arc developing due to an electric breakdown, the main component of which has twice the network frequency. In addition, only those signals are amplified which have a minimum amplitude, so that interference signals below a given level are not evaluated. The known evaluating device further takes into consideration the fact that arcs occur also during normal operation of a high-voltage switching installation, namely, when circuit breakers are switched under load. The timing component of the evaluating device passes the signals corresponding to an arc only if the signal is longer than the quenching time of the circuit breaker. In this manner it is assured that the evaluating device responds only to interference arcs and does not evaluate the switching-off arc of a circuit breaker.

In networks which include, besides overhead lines, also high-voltage switching installations which have metal encapsulations and are insulated by compressed gas, a normal, automatically operating network protection system is provided. This network protection system would respond also in the event of grounds and shorts in the switching installation and, as is common in overhead lines, cause reclosing in accordance with a predetermined system of staggering. In overhead line systems a brief interruption can cause the interference arc to be switched away, but in an encapsulated high-voltage installation, this effect practically does not exist so that the interference arc would be restarted and cause a further pressure rise in the gas space involved.

The disturbances related to arcs within a high-voltage switching installation can damage or contaminate parts of the installation. This possibility of damage results in the need to switch off individual sections of the encapsulation or gas spaces after disturbances and eliminate the pressure, so that repairing and servicing work can be carried out in the gas-containing compartments. Also other repair work or work for enlarging such an installation can require the partial disconnection and opening of existing system.

The boundary surfaces of the partitioned sections of the encapsulation or the gas spaces are the bulkhead bushing insulators. Generally, the bushings consist of plastic such as cast resin with an epoxide-resin base and are designed to withstand with sufficient safety margin the mechanical stresses arising in normal operation, including internal interference arcs when the entire metallic encapsulation is closed. In this way, the effect of an interference arc is limited to the gas space concerned. In servicing, however, a bulkhead bushing insulator may form a terminating wall element of the encapsulation which is freely accessible from one side and is acted upon only one side by the normal operating pressure of the insulating gas, the counter pressure of the otherwise adjacent gas space being absent. As a result, the unilaterally exposed bulkhead bushing insulator is mechanically stressed to a higher degree than in normal operation by a pressure rise due to an interference arc. If maximum current and a long burning time of the interference arc coincide, it can not be precluded that the bulkhead bushing insulator might burst due to the pressure increase, creating danger to the installation personnel.

SUMMARY OF THE INVENTION

An object of the invention is to provide a simpler and less elaborate means to avoid danger to personnel during installation work.

The present invention is directed to a protective device for facilitating servicing work on a high-voltage switching installation insulated with compressed gas and having a metal encapsulation. The metal encapsulation of the switching installation includes a plurality of gas-tight compartments partitioned off from one another by bulkhead bushing insulators. The protective device serves to prevent the bursting of a selected bulkhead bushing insulator upon the removal of gas pressure from one side of the selected bushing during a servicing operation.

In accordance with the present invention, the protective device comprises a monitoring unit, an evaluating unit, a voltage cut-off switch, a tripping unit, and a blocking component. The monitoring unit generates a detection signal upon detecting the presence of an electrical arc within a pressurized gas-tight compartment insulated by the selected bulkhead bushing insulator and housing voltage-carrying conductor elements. The monitoring unit includes at least one sensor attachable to an outer surface of the metal encapsulation at the pressurized gas-tight compartment. The evaluating unit is operatively connected to the monitoring unit for determining that an electrical arc sensed by the monitoring unit is an interference arc and for generating an enabling signal upon determining the existence of an interference arc.

The voltage cut-off or feed switch is operatively connected to the voltage-carrying conductor elements in the pressurized gas-tight compartment for controlling the flow of current thereto. The tripping unit is operatively coupled to the evaluating unit and to the voltage cut-off switch for opening the switch to interrupt the flow of current to the voltage-carrying conductor elements in response to the enabling signal from the evaluating unit.

The blocking component is operatively coupled to the tripping unit for at least temporarily preventing a reclosing of the voltage cut-off switch upon an opening thereof by the tripping unit.

A protective device in accordance with the invention can be attached simply and easily before servicing or maintenance work and is retained only for the duration of the work. The protective device is therefore a special tool which can be re-employed constantly. If a pressure tank of the encapsulation is removed or opened, then the adjacent bulkhead bushing insulators are exposed on one side. In accordance with the invention, at least one sensor for detecting interference arcs is attached to the outside surface of the encapsulation at the gas spaces adjacent to the servicing site which are defined by unilaterally exposed bulkhead bushing insulators and which house voltage-carrying conductor elements. The sensor is connected via the evaluating unit directly, and optionally parallel to the customary network protection arrangement, to the tripping unit for opening the feeding switch, i.e., the voltage cut-off switch, of the voltage-carrying elements of the gas space experiencing the interference arcs.

The protective device trips, upon the occurrence of an interfering arc in the gas space, the involved feeding switch or switches in so short a time, bypassing the operational network protection, that the interfering arc is switched off before the pressure rise in the gas space assumes a value which would exceed the mechanical strength of the unilaterally exposed bulkhead bushing insulator. Because the protection device likewise prevents reclosing of the feeding switch after its opening via the tripping device, danger to the installation personnel is reliably precluded.

It is preferable to use in the protective device acoustic and optical sensors, either together or as alternatives. While optical sensors such as photocells require the availability of viewing windows in the encapsulation wall, they provide the advantage of substantially simpler design of the protective device, since a sensor is required only for the gas space or compartment with the unilaterally exposed bulkhead bushing insulator, and a relatively simple evaluating device responsive to the light phenomenon caused by the interference arc.

In the tripping unit, the means for opening the feeding switch or for blocking the reclosing thereof may be of a mechanical or electrical design. Electrical means can, for instance, interrupt the circuit of the closing coil of the feeding switch. Mechanical means have the advantages of being less trouble-prone and easy to check.

It is advisable to that the protective device opens the feeding switch within 100 ms after the occurrence of the sensor signal, if possible. This speed of operation increases the safety provided by the protective device and can be realized even if acoustical sensors are used, because the normal opening arc of a circuit breaker is generally shorter than 20 ms, and can therefore be eliminated reliably via the timing member.

DETAILED DESCRIPTION

Figure 1:
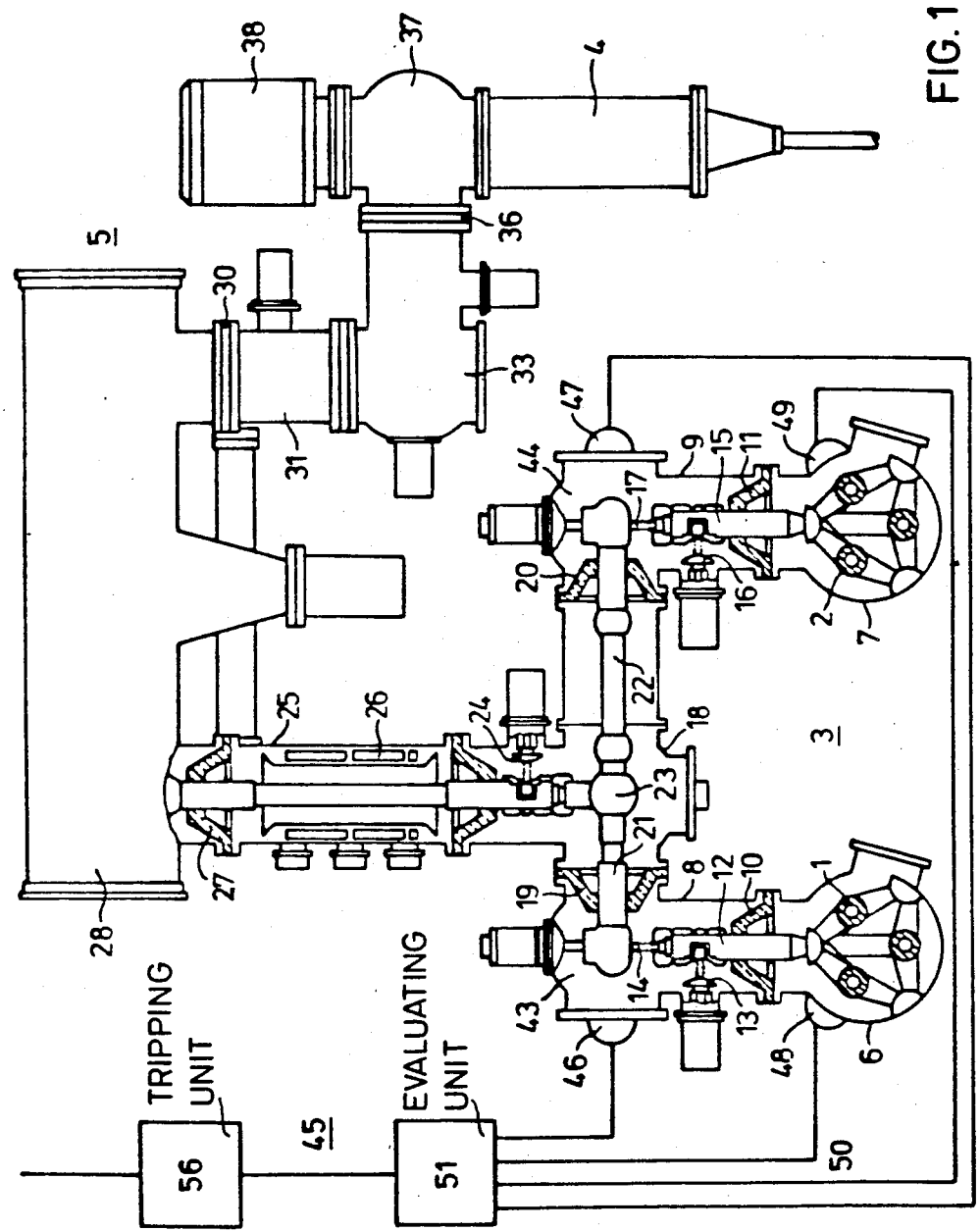
FIG. 1 is a schematic view, partly in cross section, of high-voltage switching installation encapsulated with metal and insulated with compressed gas, which is equipped with a protective device according to the invention.
Figure 2:
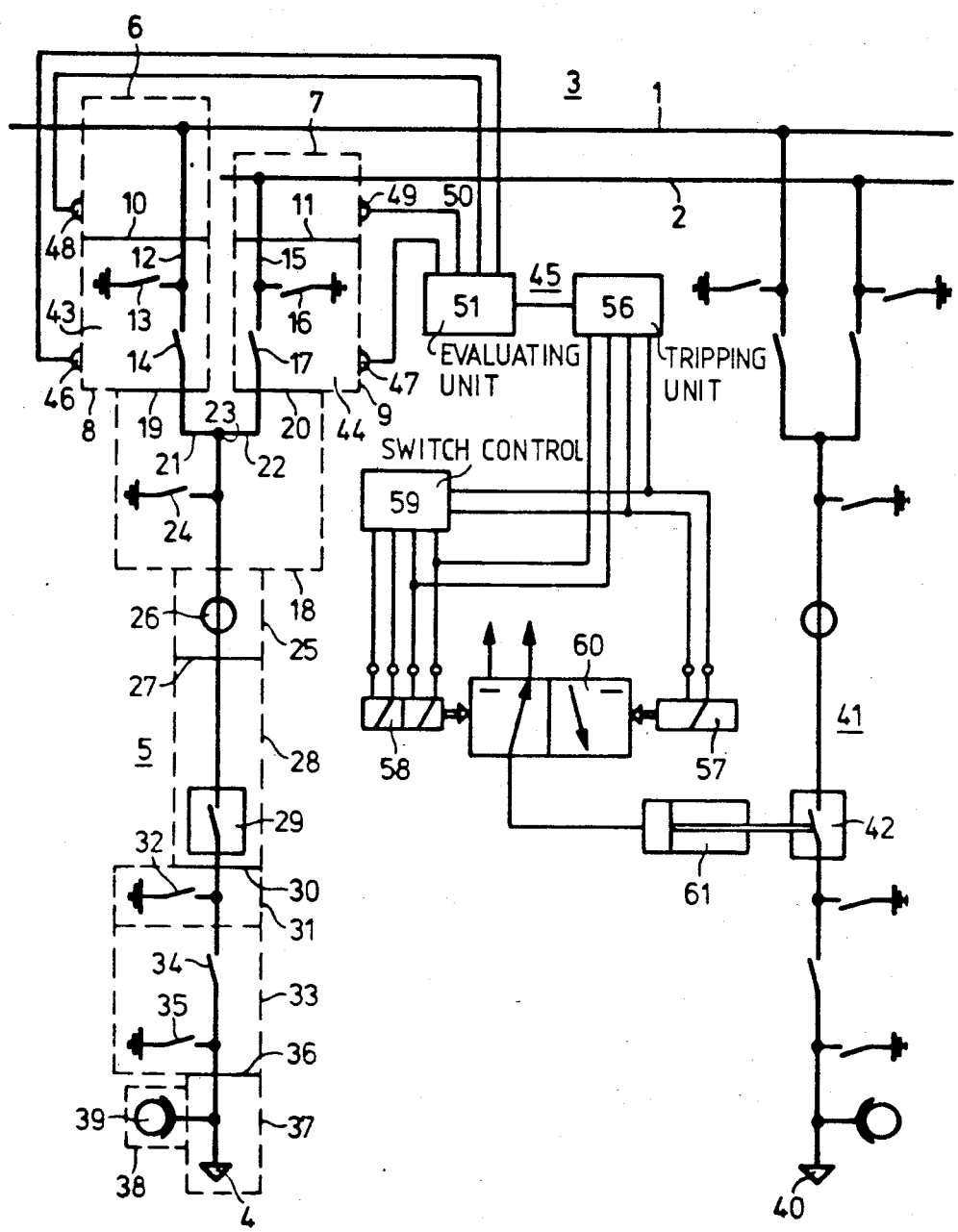
FIG. 2 is a schematic circuit diagram of the installation and protective device shown in FIG. 1.

As shown in FIGS. 1 and 2, two bus bar systems 1 and 2 are provided in a high-voltage switching installation 3 which is encapsulated with metal and insulated with compressed gas and particularly with sulfur hexafluoride ($SF^6$). The bus bar systems are encapsulated and have three poles or bars arranged parallel to each other. At a field branch 5 leading to a cable termination 4, the bus bars of bus bar system 1 are located in a pressure container or vessel 6 and those of bus bar system 2 in a pressure tank or vessel 7. Pressure tanks 6 and 7, respectively, are followed by respective pressure tanks or compartments 8 and 9, bulkhead bushing insulators 10 and 11 being provided between the pressure tanks 6, 8 and 7, 9, respectively. In pressure tank 8 are disposed conductor elements 12 connected on one side to bus bar system 1 and on an opposite side to a grounding switch 13 and a disconnect switch 14. There are similarly disposed in pressure tank 9 conductor elements 15 which are connected on one side to bus bar system 2 and on an opposite side to a grounding switch 16 and a disconnect switch 17. Pressure tanks 8 and 9 are followed by a further pressure tank 18 which is separated by a bulkhead bushing insulator 19 from pressure tank 8 and by a bulkhead bushing insulator 20 from pressure tank 9. Conductor elements 21 associated with disconnect switch 14 traverse bulkhead bushing insulator 19. Similarly, conductor elements 22 coupled to disconnect switch 17 pass through bulkhead bushing insulator 20. Conductor elements 21 and 22 are connected to each other in the interior of pressure tank 18 at a distributor building block 23, to which a grounding switch 24 is connected.

Pressure tank 18 is followed in the course of field branch 5, via a normal feedthrough, by a pressure tank 25 which contains a current transformer 26, and via a bulkhead bushing insulator 27, by a pressure tank 28 which contains a circuit breaker 29. Another bulkhead bushing insulator 30 separates or insulates tank 28 from an adjacent pressure tank 31 housing a grounding switch 32. Tank 31 is followed by yet another pressure tank 33 enclosing a disconnect switch 34 and a grounding switch 35. Tank 33 is separated or insulated via a bulkhead bushing insulator 36 from another adjacent pressure vessel 37 which contains cable termination 4, to which pressure vessel a pressure tank 38 with a voltage transformer 39 is connected.

As illustrated in FIG. 2, high-voltage switching installation 3 is provided with a second field branch 41 of the same design as the field branch 5. Field branch 41 likewise leads to a cable termination 40 and has a circuit breaker in the form of a feeding switch 42 for cutting off the voltage in bus bar systems 1 and 2.

If the pressure is removed from the pressure tank 18 field in the course of maintenance work and the pressure tank is opened or removed, disconnect switches 14 and 17 are first opened in order to interrupt the connection to bus bar systems 1 and 2. The normal pressure of the insulating gas is maintained in the pressure tanks 8 and 9, whereby bulkhead bushing insulators 19 and 20 are exposed only on one side to the operating pressure of the insulating gas, while they are exposed on the other side to atmospheric pressure. Bus bar systems 1 and 2 can continue to be operated normally during the maintenance work at distributor building block 23. In gas spaces 43 and 44 of pressure tanks 8 and 9, however, conductor parts 12 and 15 carry voltage, whereby an interference arc may occur in gas spaces 43 and 44. Under unfavorable conditions, such interference arcs could cause a pressure increase leading to a bursting of bulkhead bushing insulators 19 and 20 owing to a mechanical overstress. This would endanger the personnel carrying out service work on distributor building block 23.

To eliminate this danger, a protective device 45 is provided which, for the entire duration of the servicing work on switching installation 3, is operatively coupled to gas spaces 43 and 44 or compartments 8 and 9 and the feeding control or voltage cut-off switch 42 for bus bar systems 1 and 2.

Protective device 45 comprises four acoustic sensors 46-49 in the form of microphones for detecting sound transmitted through solid matter. Sensor 46 is removably attachable to an outer surface of the encapsulation at pressure vessel 8, while acoustic sensor 47 is similarly located at pressure vessel 9. Acoustic sensors 46 and 47 monitor gas spaces 43 and 44 in which interfering arcs will be picked up immediately. Since, however, the acoustic noises generated by an interfering arc are transmitted through the encapsulation walls of adjacent pressure vessels, sensors 46 and 47 will also detect an interfering arc in an adjacent field branch, sound waves of which are transmitted via pressure tanks 6 and 7 to pressure tanks 8 and 9, respectively. In order to ascertain from which direction sound picked up by sensors 46 and 47 comes, acoustic sensor 48 is arranged on pressure tank 6 and acoustic sensor 49 on pressure tank 7.

If an interference arc occurs in a part of high-voltage switching installation 3 other than tanks 8 and 9, acoustic sensors 48 and 49 will detect a louder noise than acoustic sensors 46 and 47. The reverse is the case for an interference arc in gas space 43 or 44. Differences in the propagation time of the acoustic signals can also be detected, whereby the location of an interfering arc can be ascertained, particularly if it occurs immediately in gas space 43 or 44.

Figure 4:
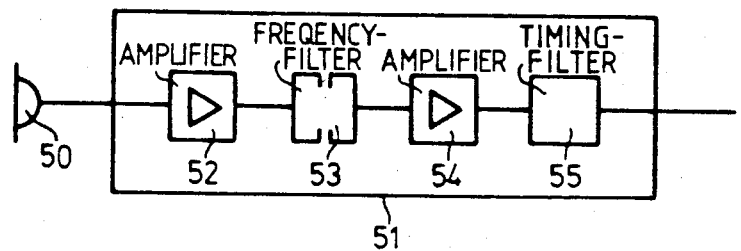
FIG. 4 is a block diagram of an evaluating unit shown in FIG. 2.

Acoustic sensors 46 and 49 together form a monitoring unit 50 of protective device 45. Detection signals generated by monitoring unit 50 are fed to an evaluating unit 51. The structure of evaluating unit 51 is shown in detail in FIG. 4. Monitoring unit 50 feeds its detection signal first to an amplifier 52, the output of which is connected to a filter 53 which can be tuned to twice the network frequency, e.g., to 110-120 Hz, in order to pass only signals which correspond to an arc. (An arc started because of a dielectric breakdown makes a characteristic noise, the main component of which has twice the network frequency.) Filter 53 may be adjustable. The output signal of filter 53 is fed to an amplifier 54, the amplitude of which can be tuned and which amplifies only those signals which have a minimum amplitude, so that interference signals below a given level are not evaluated. The output of amplifier 54 is fed to a timing device 55 which designed to pass signals only if the corresponding noise persists longer than the quenching time of a circuit breaker. Interruption arcs of a circuit breaker are normal in the operation of a high-voltage switching installation 3 and should not lead to a response of evaluating unit 51. The evaluating unit should pick up only interference arcs equivalent as to their acoustic signals. In this manner it is assured that detection signals due to a switching-off arc of a circuit breaker are not transmitted by evaluating unit 51.

In the event that an interference arc in gas space 43 or 44 is picked up by monitoring unit 50, evaluating unit 51 transmits an enabling signal to a tripping unit 56. This tripping unit 56 comprises electrical means for energizing a closing magnet 57 and an opening magnet 58 of feeding switch 42 The "on" and "off" magnets 57 and 58 are actuated in normal operation by a switch control 59, which is also connected to the network protection system. These normal electrical connections are partly shunted by output leads of tripping unit 56. If an enabling signal indicating that an interfering arc has occurred in one of the gas spaces 43 and 44 is transmitted to tripping unit 56, this unit causes the immediate opening of feeding switch 42, it being assured that the latter is switched off not later than 100 mg after the generation of the detection signal by monitoring unit 50. The opening of feed switch 42 is achieved by means of "off" magnet 58, a valve 60 and actuator 61 of feeding switch 42. In addition, tripping unit 56 interrupts the circuit of "on" magnet 57, so that this magnet can no longer influence actuator 61 of feeding switch 42. Reclosing feeding switch 42 by switch control 50 after the response of the protection device is therefore impossible. By switching off feeding switch 42, the voltage to bus bar systems 1 and 2 is cut off, thereby extinguishing an interfering arc in gas space 43 or 44 so fast that a bursting of bulkhead bushing insulator 19 or 20 due to a pressure rise cannot occur. In this way, danger to the personnel carrying out the maintenance work is eliminated.

Figure 3:
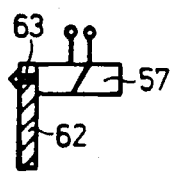
FIG. 3 shows a detail of FIG. 2 in a modified form.

FIG. 3 shows that the "on" magnet 57 for feeding switch 42 can be blocked against reclosing, additionally or alternately, by mechanical means. For this purpose, a plate 62 which has a corresponding cutout, is pushed over and engages a plunger 63 of "on" magnet 57, thereby mechanically preventing the plunger from moving so that feeding switch 42 can no longer be switched-on by switch control 59.

Figure 5:
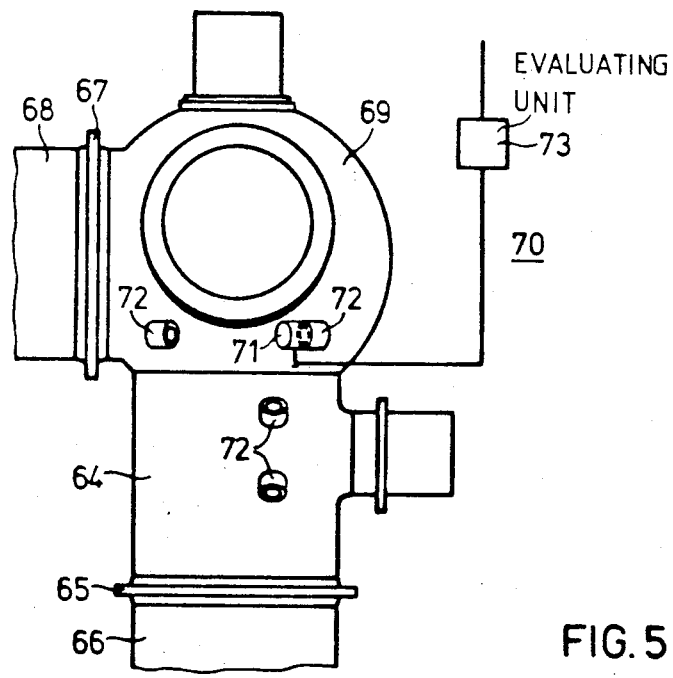
FIG. 5 is an elevational view of a pressure tank of a second embodiment of the protective device in accordance with the present invention.

FIG. 5 shows a pressure vessel 64 which contains a disconnect switch and a grounding switch. This pressure vessel is connected on the one side via a bulkhead bushing insulator 65 to a pressure vessel 66 of a bus bar system. On the other side, a bulkhead bushing insulator 67 is likewise provided which leads to a pressure vessel 68 of a distributor building block.

In installation work requiring the opening or removal of pressure vessel 68, bulkhead bushing insulator 67 will be exposed on one side, and, in a gas space 69 of pressure vessel 64, voltage-carrying conductor parts will be present, provided that the bus bar system in pressure vessel system 66 remains in operation. Protective device 70 is installed prior to the servicing work.

This protective device comprises optical sensors or photocells 71, viewing windows 72 being arranged in the encapsulation wall of pressure vessel 64 so that the switching gaps of the disconnect switch and the grounding switch can be observed through them. At one viewing window 72, a photocell is arranged which responds to an interference arc in the interior of gas space 69. The signals of the optical sensor 71 are fed to an evaluating unit 73 which is part of protective device 70 and which operates in the same manner as protective device 45 described above with reference to FIGS. 1 and 2.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the descriptions and illustrations herein are profferred by way of example to facilitate comprehension of the invention and should not be construed to limit the scope thereof.

What is claimed is:

1. In a high-voltage switching installation insulated with compressed gas and having a metal encapsulation, said metal encapsulation including a plurality of gas-tight compartments partitioned off from one another by bulkhead bushing insulators, a protective device for facilitating servicing work on the switching installation by preventing the bursting of a selected bulkhead bushing insulator upon the removal of gas pressure from one side of the selected bulkhead bushing insulator during a servicing operation, said protective device comprising:

monitoring means for generating a detection signal upon detecting the presence of an electrical arc within a pressurized gas-tight compartment insulated by the selected bulkhead bushing insulator and housing voltage-carrying conductor elements, said monitoring means including at least one sensor attachable to an outer surface of the metal encapsulation at said pressurized gas-tight compartment;

evaluating means operatively connected to said monitoring means for determining that an electrical arc sensed by said monitoring means is an interference arc and for generating an enabling signal upon determining the existence of an interference arc;

voltage cut-off means including a feed switch operatively connected to said voltage-carrying conductor elements for controlling the flow of current thereto;

tripping means operatively coupled to said evaluating means and to said voltage cut-off means for opening said feed switch to interrupt the flow of current to said voltage-carrying conductor elements in response to said enabling signal; and blocking means operatively coupled to said tripping means for at least temporarily preventing a reclosing of said feed switch upon an opening thereof by said tripping means.

2. The protective device according to claim 1 wherein said feed switch is opened by said tripping means no later than 100 milliseconds after the generation of said detection signal by said monitoring means.

3. The protective device according to claim 2 wherein said encapsulation is provided with at least one viewing window at said pressurized gas-tight compartment and wherein said sensor is an optical sensor attachable to said encapsulation at said viewing window.

4. The protective device according to claim 2 wherein said sensor is acoustic and wherein said evaluating means includes a frequency-dependent filter and a timing unit.

5. The protective device according to claim 4 wherein the installation includes a pressure vessel adjacent said pressurized gas-tight compartment and wherein said monitoring means includes an additional acoustic sensor attachable to said encapsulation at said pressure vessel.

6. The protective device according to any one of claims 1 through 5 wherein said blocking means is mechanical.

7. The protective device according to claim 6 wherein said voltage cut-off means includes an electromagnet operable to close said feed switch, said electromagnet having a shiftable plunger, said blocking means being engageable with said plunger to prevent shifting motion thereof.

* * * * *